US012552298B2

(12) United States Patent
Lim et al.

(10) Patent No.: US 12,552,298 B2
(45) Date of Patent: Feb. 17, 2026

(54) MANUAL SEATBACK FOLDING APPARATUS OF ELECTRIC SEAT FOR VEHICLE

(71) Applicants: Hyundai Motor Company, Seoul (KR); Kia Corporation, Seoul (KR); DAS Co., Ltd., Gyeongju-si (KR)

(72) Inventors: Deok Soo Lim, Hwaseong-si (KR); Sang Do Park, Suwon-si (KR); Sang Soo Lee, Hwaseong-si (KR); Chan Ho Jung, Gunpo-si (KR); Sang Hark Lee, Incheon (KR); Song Min Baek, Suwon-si (KR); Seung Heon Ryu, Yongin-si (KR)

(73) Assignees: HYUNDAI MOTOR COMPANY, Seoul (KR); KIA CORPORATION, Seoul (KR); DAS CO., LTD, Gyeongju-si (KR)

( * ) Notice: Subject to any disclaimer, the term of this patent is extended or adjusted under 35 U.S.C. 154(b) by 312 days.

(21) Appl. No.: 18/310,707

(22) Filed: May 2, 2023

(65) Prior Publication Data

US 2024/0174138 A1  May 30, 2024

(30) Foreign Application Priority Data

Nov. 24, 2022  (KR) .................. 10-2022-0158822

(51) Int. Cl.
*B60N 2/235* (2006.01)
*B60N 2/02* (2006.01)
*B60N 2/30* (2006.01)
*B60N 2/90* (2018.01)

(52) U.S. Cl.
CPC ......... *B60N 2/235* (2013.01); *B60N 2/02246* (2023.08); *B60N 2/3004* (2013.01); *B60N 2002/952* (2018.02)

(58) Field of Classification Search
CPC ........................... B60N 2/235; B60N 2/02246
See application file for complete search history.

(56) References Cited

U.S. PATENT DOCUMENTS

| | | | | |
|---|---|---|---|---|
| 2010/0096897 A1* | 4/2010 | Kienke | ................ | B60N 2/2352 16/349 |
| 2022/0258651 A1* | 8/2022 | Naik | .................... | B60N 2/2356 |
| 2024/0051437 A1* | 2/2024 | Kim | ..................... | B60N 2/2352 |

* cited by examiner

*Primary Examiner* — David R Dunn
*Assistant Examiner* — Tania Abraham
(74) *Attorney, Agent, or Firm* — SLATER MATSIL, LLP (57) ABSTRACT

An embodiment manual seatback folding apparatus of an electric seat for a vehicle includes a shaft fastened to a seatback frame, wherein first and second end portions of the shaft are rotatably inserted into first and second seat cushion side frames, respectively, a first rotatable disk including a first locking recess, a second rotatable disk including a second locking recess and a pusher, a first manual control device detachably engaged with the first locking recess, a second manual control device to be connected to the first manual control device through a cable and detachably engaged with the second locking recess, and a switch device mounted on an outer surface of the second seat cushion side frame and configured to perform a switching operation in response to the pusher in a state in which the second rotatable disk is rotated in a folding direction.

20 Claims, 9 Drawing Sheets

MANUAL SEATBACK FOLDING APPARATUS OF ELECTRIC SEAT FOR VEHICLE

CROSS-REFERENCE TO RELATED APPLICATIONS

This application claims the benefit of Korean Patent Application No. 10-2022-0158822, filed on Nov. 24, 2022, which application is hereby incorporated herein by reference.

TECHNICAL FIELD

The present disclosure relates generally to a manual seatback folding apparatus of an electric seat for a vehicle.

BACKGROUND

Generally, in an emergency situation of a vehicle provided with three or more rows of seats in the interior of the vehicle, passengers seated in the first and second rows of seats may rapidly escape by opening front and rear doors, but passengers seated in a third row of seats may not rapidly obtain an emergency escape passage due to the presence of the seatback of a seat in the second row.

Thus, when a passenger seated in a seat in the third row is able to easily fold the seatback of a seat in the second row, the emergency escape passage for passengers seated in the third row of seats may be easily obtained.

However, when the seat in the second row is an electric seat, folding the seatback is performed by driving a motor by operating a switch, and thus the seatback may not be rapidly folded.

Furthermore, a power seat switch for folding the seatback is provided on a side portion of the seat cushion of the seat in the second row, thus the passenger seated in the seat in the third row may not directly operate the power seat switch. Consequently, it is impossible to easily obtain the emergency escape passage by folding the seatback.

The foregoing is intended merely to aid in the understanding of the background of embodiments of the present disclosure and is not intended to mean that the present disclosure falls within the purview of the related art that is already known to those skilled in the art.

SUMMARY

The present disclosure relates generally to a manual seatback folding apparatus of an electric seat for a vehicle. Particular embodiments relate to a manual seatback folding apparatus of an electric seat for a vehicle, the apparatus enabling a passenger seated in a rear seat to manually fold a seatback of a front seat in order to obtain an emergency escape passage.

Accordingly, embodiments of the present disclosure address problems occurring in the related art, and embodiments of the present disclosure proposes a manual seatback folding apparatus of an electric seat for a vehicle, the apparatus enabling a passenger seated in a rear seat to fold the seatback of a front seat only by a manual operation of pulling a strap, whereby an emergency escape passage for passengers seated in rear seats may be rapidly and easily obtained.

In addition, embodiments of the present disclosure propose a manual seatback folding apparatus of an electric seat for a vehicle, wherein after a passenger seated in a rear seat has folded the seatback of a front seat only by a manual operation of pulling a strap, the apparatus may cut off power to seat position adjustment motors of the electric seat in order to prevent the seatback from being unfolded in response to driving of any of the motors caused by accidental manipulation of a power seat switch or an erroneous operation of any of the motors caused by a collision.

According to one embodiment of the present disclosure, there is provided a manual seatback folding apparatus of an electric seat for a vehicle. The manual seatback folding apparatus may include a shaft fastened to a seatback frame to be simultaneously rotatable with the seatback frame, with both end portions thereof being rotatably inserted into a first seat cushion side frame and a second seat cushion side frame, a first rotatable disk fastened to one end portion of the shaft and rotatably arranged on an outer surface of the first seat cushion side frame, the first rotatable disk including a first locking recess provided in an outer circumferential portion thereof, a second rotatable disk fastened to the other end portion of the shaft and rotatably arranged on an outer surface of the second seat cushion side frame, the second rotatable disk including a second locking recess provided in an outer circumferential portion thereof and a pusher protruding from an outer surface thereof, a first manual control device mounted on the outer surface of the first seat cushion side frame and detachably engaged with the first locking recess, a second manual control device mounted on the outer surface of the second seat cushion side frame to be connected to the first manual control device through a cable so as to work in concert with the first manual control device and detachably engaged with the second locking recess, and a switch device mounted on the outer surface of the second seat cushion side frame and configured to perform a switching operation in response to the pusher when the second rotatable disk rotates in a folding direction.

The first manual control device may include a first cam having one end portion thereof hinge-fastened to the outer surface of the first seat cushion side frame, wherein the first cam includes a first locking pin provided on an upper portion of the other end portion thereof to be inserted into the first locking recess of the first rotatable disk and a first unlocking recess and a first locking support end provided side by side on a lower portion of the other end portion, a first pawl including a first support protrusion provided on an upper portion of the other end portion to be in contact with the first locking support end or inserted into the first unlocking recess, the first pawl being hinge-fastened to the outer surface of the first seat cushion side frame, and a lever including a first pulling bar on an upper portion with a strap being connected to the first pulling bar and the lever coaxially fastened to the first pawl to be simultaneously rotatable with the first pawl.

The first pawl may include an engagement pin provided on one end portion, the lever includes an engagement hole on one end portion, and the engagement pin is configured to be inserted into and fastened to the engagement hole.

The manual seatback folding apparatus may further include a first return spring connected to the engagement pin of the first pawl and the first seat cushion side frame to provide the first pawl and the lever with elastic restoring force in a locking direction.

The lever may further include a second pulling bar on the other end portion, the second pulling bar being connected to the second manual control device through the cable.

The first seat cushion side frame may include a strap holding portion provided on the outer surface of the first seat cushion side frame adjacent to a rear portion to guide the strap to a position in which a passenger is able to pull the strap.

The second manual control device may include a second cam with one end portion thereof being hinge-fastened to the outer surface of the second seat cushion side frame, wherein the second cam includes a second locking pin provided on an upper portion of the other end portion thereof to be inserted into the second locking recess of the second rotatable disk and a second unlocking recess and a second locking support end provided side by side on a lower portion of the other end portion thereof, and a second pawl including a cable connection end provided on one end portion thereof to be connected to the cable and a second support protrusion provided on an upper portion thereof to be in contact with the second locking support end or inserted into the second unlocking recess, wherein the second pawl is hinge-fastened to the outer surface of the second seat cushion side frame.

The manual seatback folding apparatus may further include a second return spring connected to the cable connection end of the second pawl and the second seat cushion side frame to provide elastic restoring force to the second pawl in a locking direction.

The switch device may include a bracket mounted on the outer surface of the second seat cushion side frame, a limit switch mounted on a lower portion of the bracket, and a switch control lever hinge-fastened to an upper portion of the bracket and configured to be rotated in a switching direction of the limit switch by the pusher provided on the second rotatable disk.

The switch control lever may include a rotatable lever provided on one end portion of the switch control lever about a hinge fastening point of the bracket to be contactable with the pusher provided on the second rotatable disk, a switch operating end provided on a lower portion of the switch control lever to cause the limit switch to perform a switching operation, and a spring connection end protruding from the other end portion of the switch control lever.

The manual seatback folding apparatus may further include a third return spring connected to the spring connection end of the switch control lever and a predetermined position of the bracket to provide the switch control lever with elastic restoring force.

The pusher may extend a predetermined length on the outer surface of the second rotatable disk along a curved line in a circumferential direction so as to press the rotatable lever and allow the rotatable lever to maintain a state rotated in the switching direction of the limit switch.

The manual seatback folding apparatus may further include a controller configured to cut off power to seat position adjustment motors when a signal generated by switching the limit switch by the switch control lever is received.

The controller may be configured to allow the power to be supplied to the seat position adjustment motors when the signal generated by switching the limit switch by the switch control lever is not received.

Embodiments of the present disclosure provide the following effects.

First, since a passenger seated in a rear seat may fold the seatback simply by a manual operation of pulling a strap, an emergency escape passage for passengers seated in rear seats may be rapidly and easily obtained.

Second, since power to seat position adjustment motors of the electric seat may be cut off after a passenger seated in a rear seat has folded the seatback of a front seat by the manual operation of pulling the strap, it is possible to prevent an unintended consequence such as automatic adjustment in the position of the electric seat in the case of emergency folding of the seatback. That is, it is possible to prevent accidental unfolding of the seatback in response to driving of any of the motors caused by accidental manipulation of the power seat switch or an erroneous operation of any of the motors caused by a collision.

That is, after the seatback is manually folded to obtain the emergency escape passage, when the position of the electric seat (i.e., a seat, the seatback of which is manually folded) is adjusted variously in response to driving of any of the motors caused by accidental manipulation of the power seat switch or an erroneous operation of any of the motors caused by a collision, emergency escape of the passenger may be interrupted against the intention. To overcome this problem, the controller receiving the switching signal of the limit switch may cut off power to the seat position adjustment motors of the electric seat, whereby the emergency escape passage may be more easily obtained by manual folding of the seatback.

Third, when the switching signal of the limit switch is not received, the controller may determine the current situation is not an emergency escape situation and allow power to be supplied to the seat position adjustment motors. Accordingly, in normal times, a seatback folding operation or a seatback unfolding operation may be performed by driving of the motors.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings.

Figure 1:
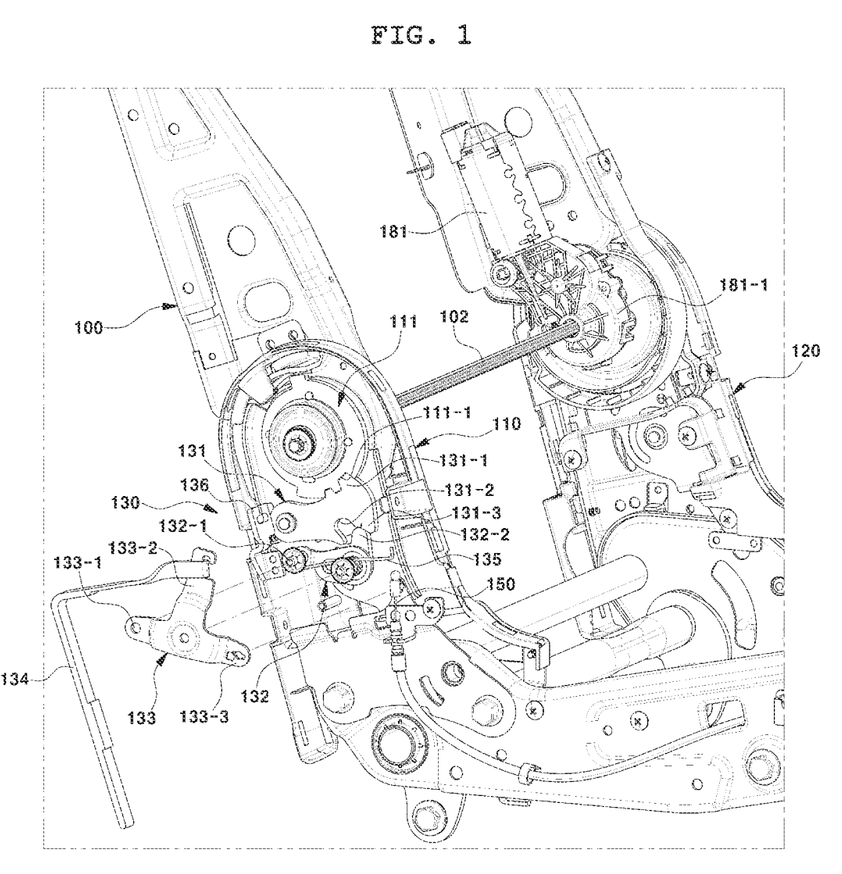
FIGS. 1 and 2 are exploded perspective views illustrating a manual seatback folding apparatus of an electric seat for a vehicle according to embodiments of the present disclosure.
Figure 2:
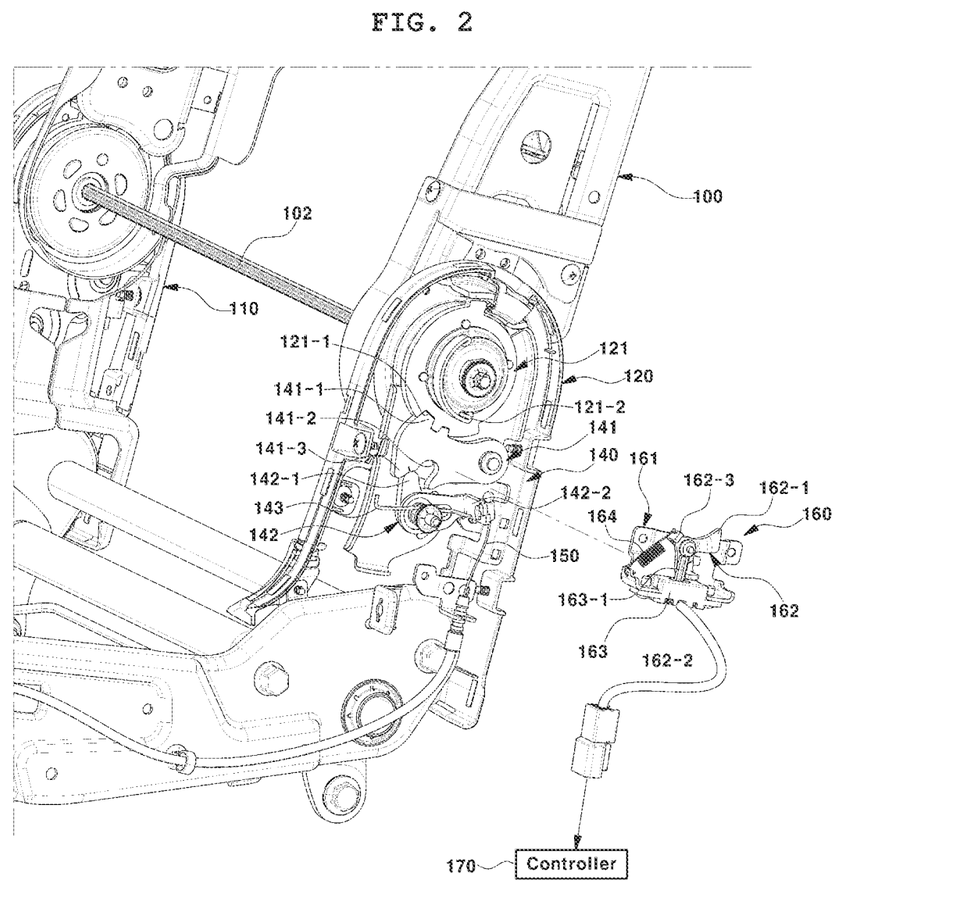

In the accompanying drawings, FIGS. 1 and 2 are exploded perspective views illustrating a manual seatback folding apparatus of an electric seat for a vehicle according to embodiments of the present disclosure.

As illustrated in FIGS. 1 and 2, the lower ends of both sides of a seatback frame 100 are rotatably connected to first and second seat cushion side frames 110 and 120, respectively, for folding and unfolding operations of the seatback frame 100.

In this regard, a shaft 102 is inserted into and fastened to the lower ends of both sides of the seatback frame 100, and both ends of the shaft 102 are rotatably inserted into the first seat cushion side frame 110 and the second seat cushion side frame 120, respectively.

For reference, the first seat cushion side frame 110 refers to a seat cushion side frame arranged in the inner side in the transverse direction in the interior of the vehicle, while the second seat cushion side frame 120 refers to a seat cushion side frame arranged in the outer side.

Here, the shaft 102 has a spline cross-sectional structure to transmit rotational force to the seatback frame 100 in a folding direction or an unfolding direction when rotated.

Particularly, as illustrated in FIG. 1, the seatback frame 100 is provided with a seatback reclining motor 181 for adjusting the angle of the seatback. The seatback reclining motor 181 includes a reduction gearbox 181-1.

More specifically, the shaft 102 has the spline cross-sectional structure and is engaged with an output gear of the reduction gearbox 181-1 while extending through the reduction gearbox 181-1. Although not shown in the drawings, the output gear of the reduction gearbox 181-1 may be implemented as a ring gear in the form of an internal gear engaging with the spline of the shaft 102.

Accordingly, rotational power resulting from driving of the seatback reclining motor 181 is output through the output gear of the reduction gearbox 181-1, and the output gear rotates along with the spline of the shaft 102. In this manner, the seatback frame 100 mounted with the seatback reclining motor 181 may be folded forward about the shaft 102 or rotated from the folded position to the unfolded position at the same time that the seatback reclining motor 181 is rotated.

Thus, in normal times, the operations of folding and unfolding the seatback may be automatically performed in response to the driving of the seatback reclining motor 181.

Embodiments of the present disclosure provide that in an emergency situation of a vehicle, a passenger seated in a rear seat may easily obtain an emergency escape passage for passengers seated in a rear seat side by rapidly folding the seatback of an electric seat (i.e., a front seat) simply by a manual operation of pulling a strap.

In this regard, a first rotatable disk 111 having one or more first locking recesses 111-1 formed in the outer circumferential portion is fastened to one end portion of the shaft 102 and is rotatably arranged on the outer surface of the first seat cushion side frame 110.

In other words, the first rotatable disk in is fastened to one end portion of the shaft 102 and is rotatably arranged on the outer surface of the first seat cushion side frame 110. The first rotatable disk in has the one or more first locking recesses 111-1 in predetermined positions in the outer circumferential portion.

In addition, a second rotatable disk 121 having one or more second locking recesses 121-1 formed in the outer circumferential portion and a pusher 121-2 protruding from the outer surface is fastened to the other end portion of the shaft 102. The second rotatable disk 121 is rotatably arranged on the outer surface of the second seat cushion side frame 120.

In other words, the second rotatable disk 121 is fastened to the other end portion of the shaft 102 and is rotatably arranged on the outer surface of the second seat cushion side frame 120. The one or more second locking recesses 121-1 are formed in the outer circumferential portion of the second rotatable disk 121, and the pusher 121-2 for operating a switch device protrudes from the outer surface of the second rotatable disk 121.

In particular, a first manual control device 130 for emergency escape is mounted on the outer surface of the first seat cushion side frame 110 to be detachably engaged with the first locking recesses 111-1, and a second manual control device 140 for emergency escape is mounted on the outer surface of the second seat cushion side frame 120 to be detachably engaged with the second locking recesses 121-1 of the second rotatable disk 121.

Here, the first manual control device 130 and the second manual control device 140 are connected through a cable 150. When the first manual control device 130 is operated, the second manual control device 140 may be operated in concert with the first manual control device 130 through the cable 150.

Figure 3:
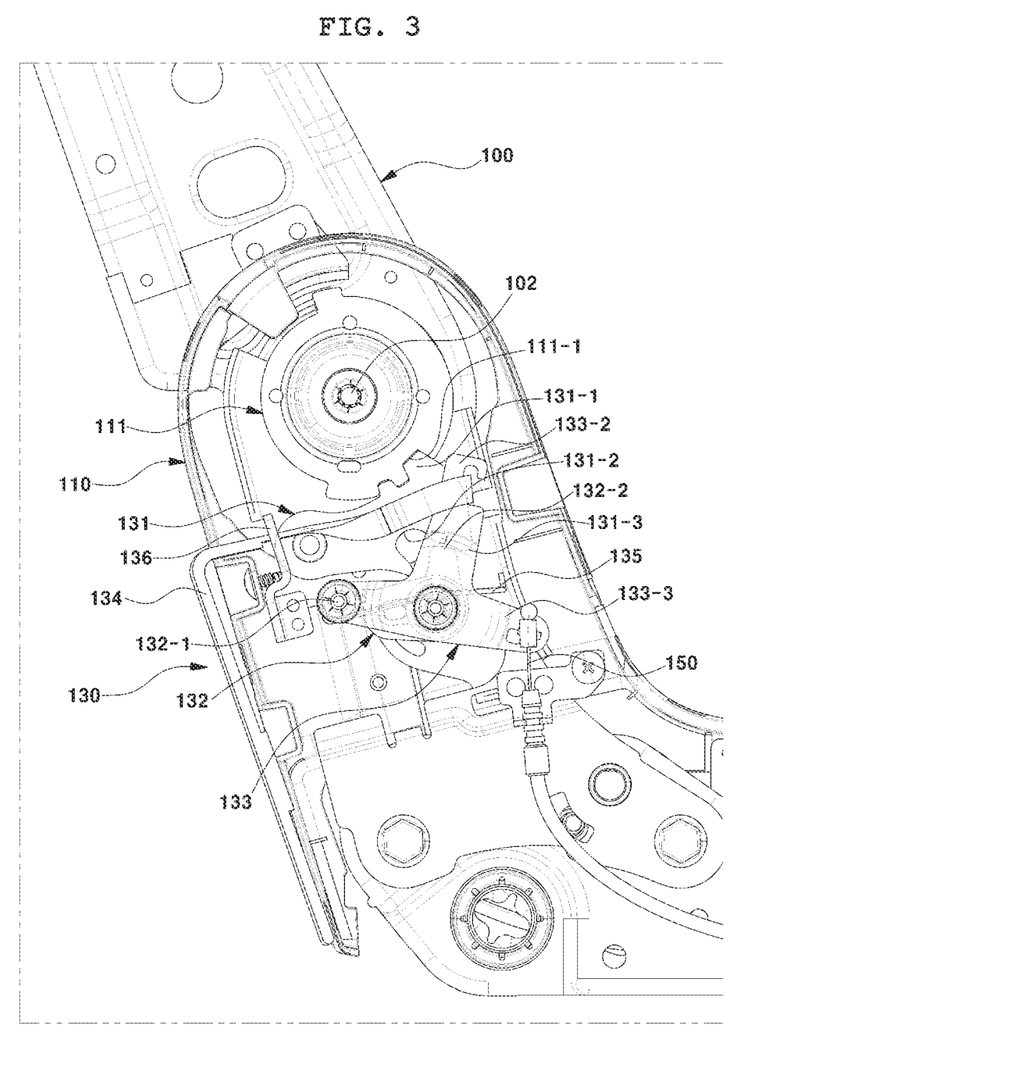
FIG. 3 is a left side view illustrating a state of the manual seatback folding apparatus according to embodiments of the present disclosure before operation.
Figure 4:
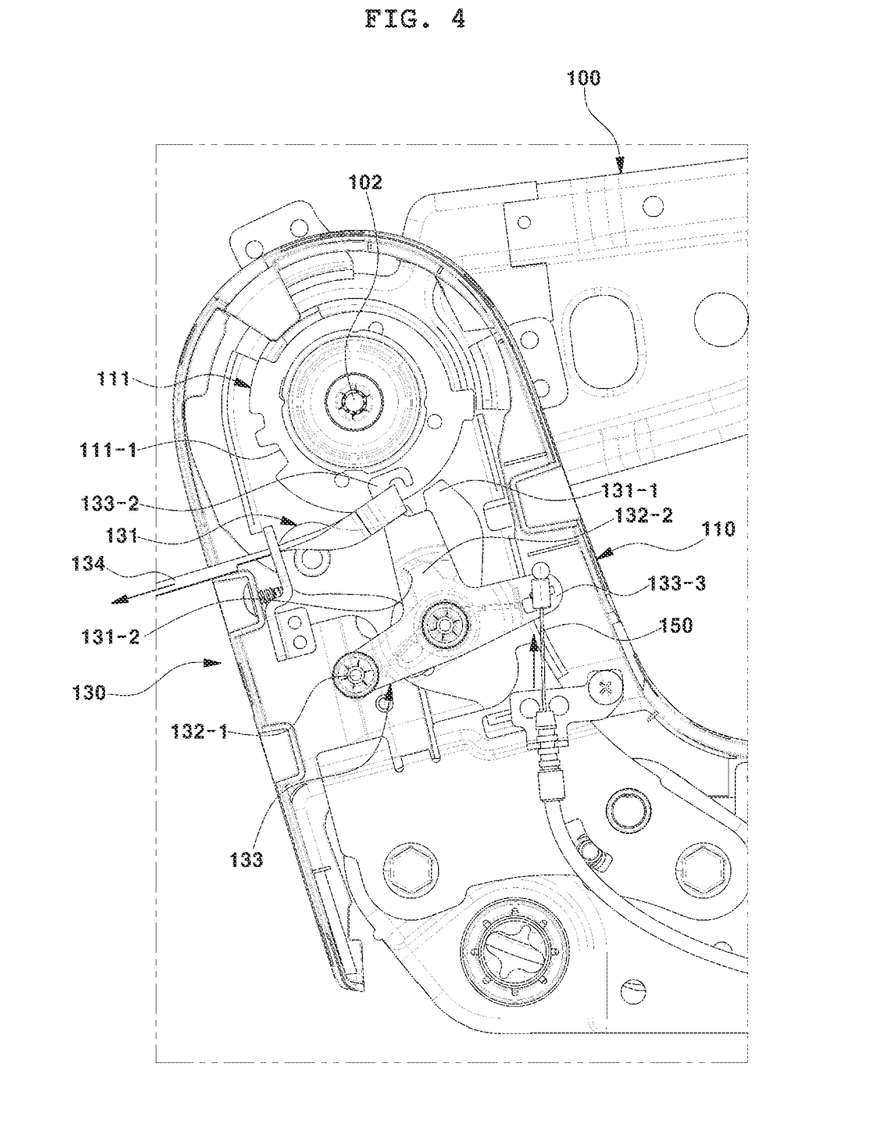
FIG. 4 is a left side view illustrating a state of the manual seatback folding apparatus according to embodiments of the present disclosure after operation, in which the seat back is folded.

As is apparent from FIGS. 3 and 4, the first manual control device 130 includes a first cam 131, a first pawl 132, a lever 133, and the like rotatably hinge-fastened to the outer surface of the first seat cushion side frame 110.

The first cam 131 is configured such that one end portion thereof is hinge-fastened to the outer surface of the first seat cushion side frame 110. The first cam 131 includes a first locking pin 131-1 provided on the upper portion of the other end portion to be inserted into the first locking recesses 111-1 of the first rotatable disk 111 and a first unlocking recess 131-2 and a first locking support end 131-3 are provided side by side on the lower portion of the other end portion.

The first pawl 132 is configured such that an engagement pin 132-1 is provided on one end portion for engagement with the lever 133 and a first support protrusion 132-2 is provided on the upper portion of the other end portion to be in contact with the first locking support end 131-3 or inserted into the first unlocking recess 131-2. The other end portion of the first pawl 132 is hinge-fastened to the outer surface of the first seat cushion side frame 110.

The lever 133 has an engagement hole 133-1 on one end portion, a first pulling bar 133-2 on the upper portion, and a second pulling bar 133-3 on the other end portion. The engagement pin 132-1 of the first pawl 132 is configured to be inserted into and fastened to the engagement hole 133-1, a strap 134 is connected to the first pulling bar 133-2, and the second pulling bar 133-3 is connected to the second manual control device 140 through the cable 150. The lever 133 is hinge-fastened to the outer surface of the first seat cushion side frame 110 coaxially with the first pawl 132.

Here, as the engagement pin 132-1 of the first pawl 132 is inserted into and fastened to the engagement hole 133-1 of the lever 133, both the first pawl 132 and the lever 133 may rotate together.

In addition, the strap 134 is configured such that a passenger pulls the strap 134 for emergency escape. The front end portion of the strap 134 is connected to the first pulling bar 133-2 of the lever 133, and the rear end portion of the strap 134 is held by a strap holding portion 136 provided on the outer surface of the first seat cushion side frame 110 adjacent to the rear portion and extends to a rear position in which the passenger may reach the strap 134 to pull.

In addition, a first return spring 135 is connected to the engagement pin 132-1 of the first pawl 132 and a predetermined position of the outer surface of the first seat cushion side frame 110 to provide the first pawl 132 and the lever 133 with elastic restoring force in a locking direction toward the original positions.

Figure 5:
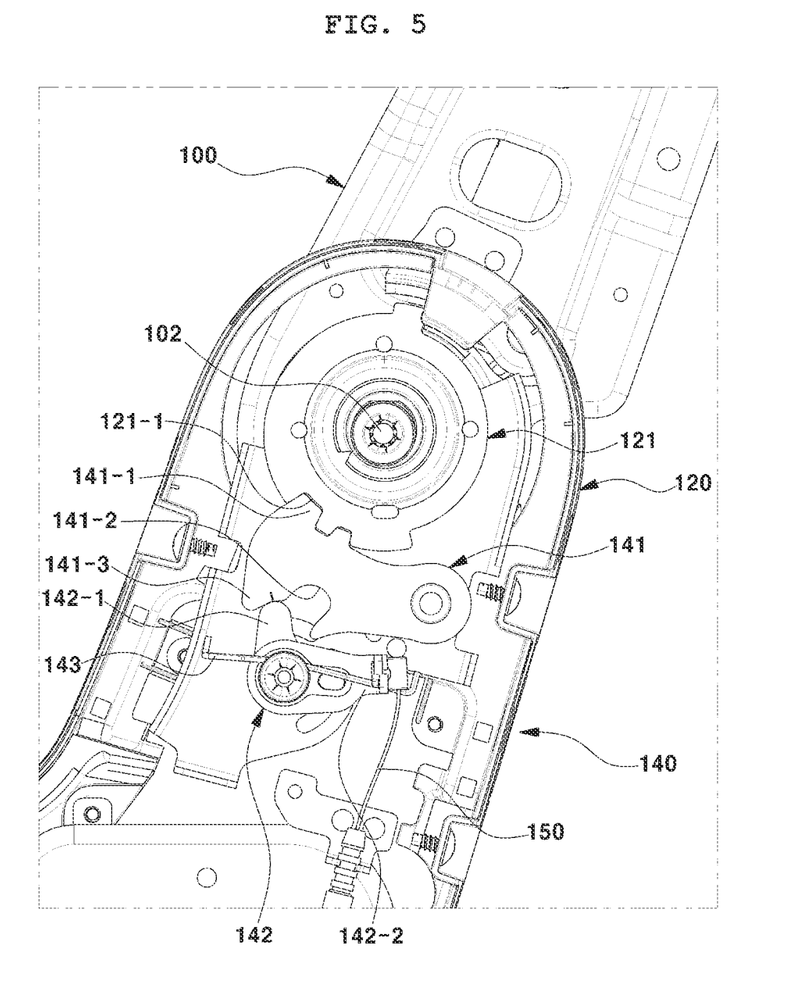
FIG. 5 is a right side view illustrating the state of the manual seatback folding apparatus according to embodiments of the present disclosure before operation, from which the switch device is excluded.
Figure 6:
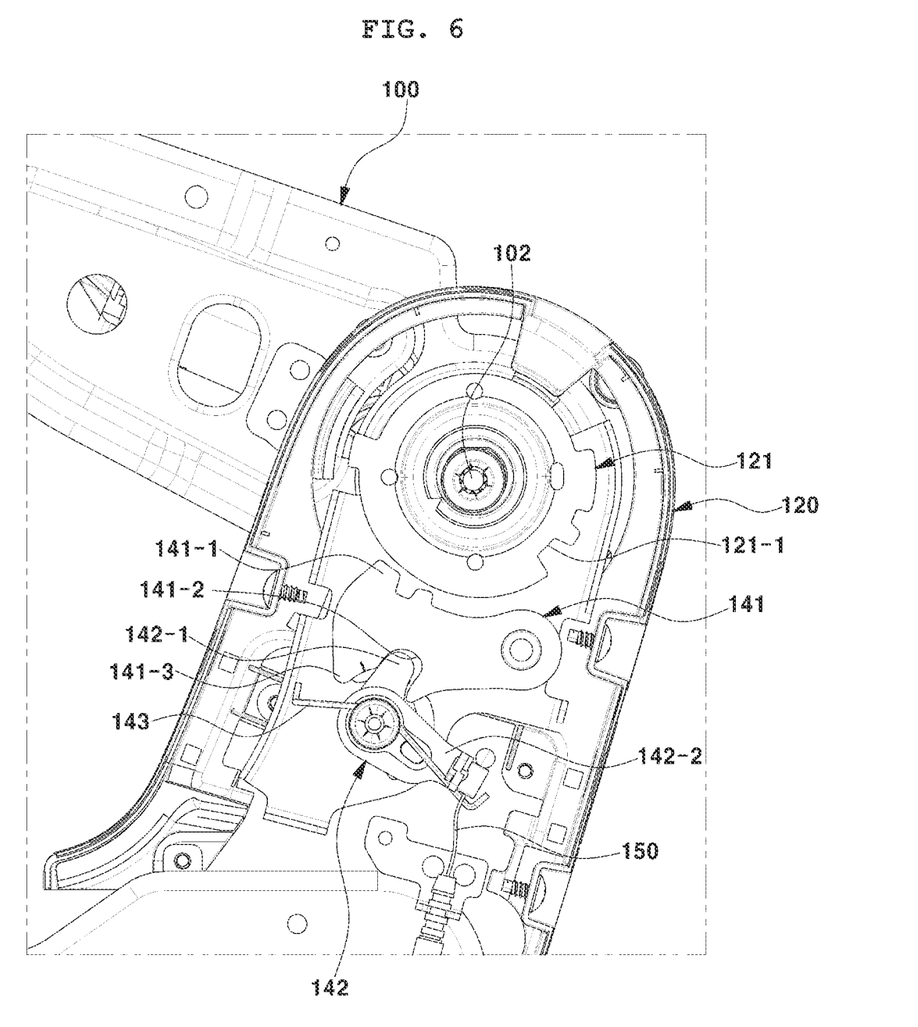
FIG. 6 is a right side view illustrating the state of the manual seatback folding apparatus according to embodiments of the present disclosure after operation, from which the switch device is excluded.

As is apparent from FIGS. 5 and 6, the second manual control device 140 includes a second cam 141, a second pawl 142, and the like. The second cam 141 is configured to be rotatably hinge-fastened to the outer surface of the second seat cushion side frame 120.

One end portion of the second cam 141 is hinge-fastened to the outer surface of the second seat cushion side frame 120. A second locking pin 141-1 is provided on the upper portion of the other end portion of the second cam 141 to be inserted into the second locking recesses 121-1 of the second rotatable disk 121. A second unlocking recess 141-2 and a second locking support end 141-3 are provided side by side on the lower portion of the other end portion.

A cable connection end 142-2 is provided on one end portion of the second pawl 142 to be connected to the cable 150. A second support protrusion 142-1 is provided on the upper portion of the other end portion of the second pawl 142 to be in contact with the second locking support end 141-3 or inserted into the second unlocking recess 141-2. The second pawl 142 is hinge-fastened to the outer surface of the second seat cushion side frame 120.

In addition, a second return spring 143 is connected to the cable connection end 142-2 of the second pawl 142 and a predetermined position of the outer surface of the second seat cushion side frame 120 to provide elastic restoring force to the second pawl 142 in a locking direction toward the original position.

A switch device 160 is provided on the outer surface of the second seat cushion side frame 120 to be switch-operated by the pusher 121-2 protruding from the outer surface of the second rotatable disk 121 when the second rotatable disk 121 is rotated in the folding direction.

Figure 7:
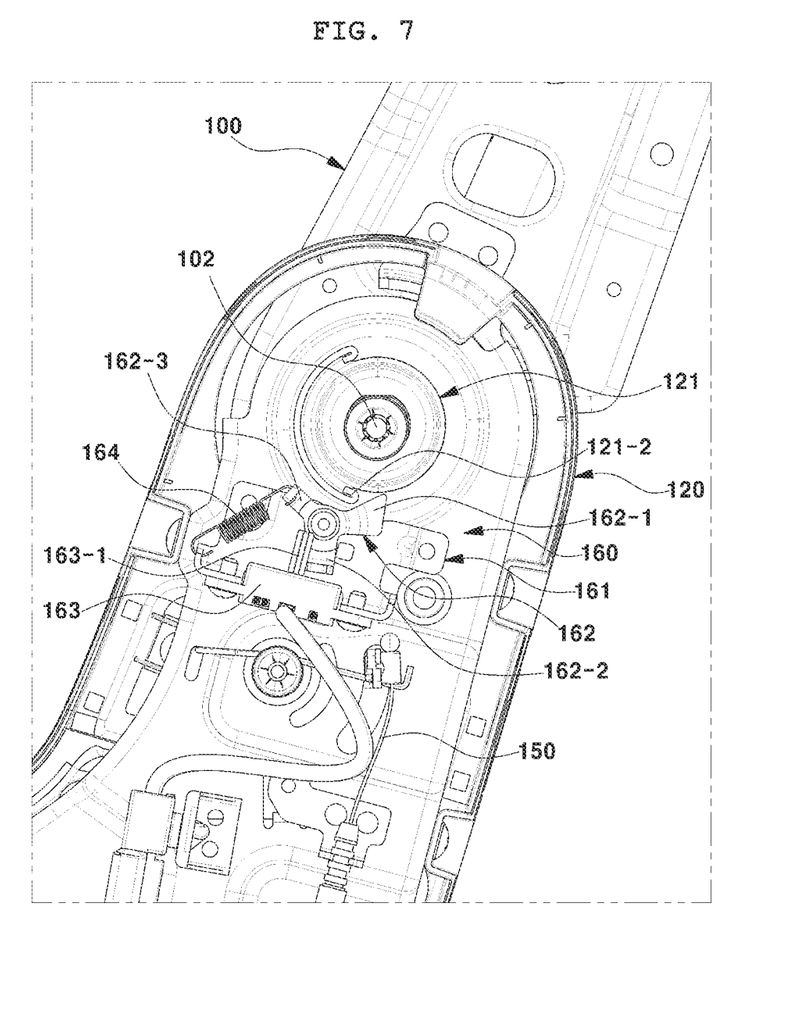
FIG. 7 is a right side view illustrating the state of the manual seatback folding apparatus according to embodiments of the present disclosure before operation, in which the switch device is included.
Figure 8:
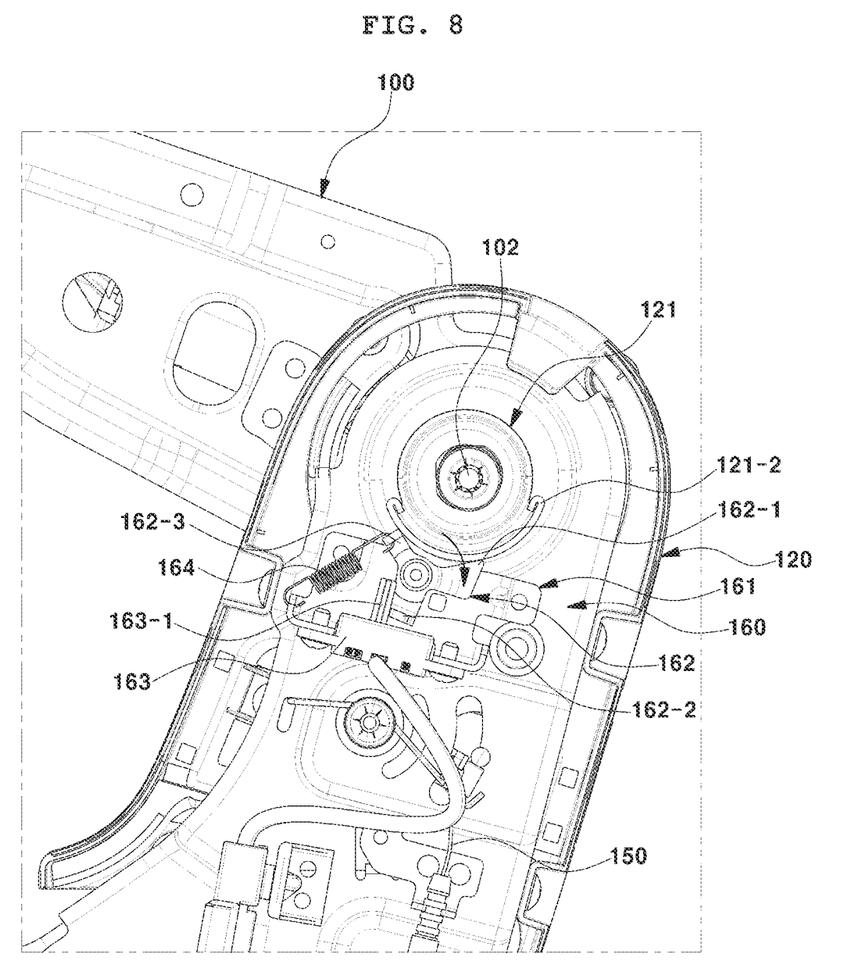
FIG. 8 is a right side view illustrating the state of the manual seatback folding apparatus according to embodiments of the present disclosure after operation, in which the switch device is included.

As is apparent from FIGS. 7 and 8, the switch device 160 includes a bracket 161 mounted on the outer surface of the second seat cushion side frame 120, a switch control lever 162 mounted on the bracket 161, a limit switch 163, and the like.

The bracket 161 is mounted on the outer surface of the second seat cushion side frame 120 while covering the second cam 141.

The limit switch 163 has a structure including a switching lever 163-1 and is mounted on the lower portion of the bracket 161.

Here, the limit switch 163 may be configured to output a switching signal when the switching lever 163-1 is pressed in one direction by external force. When the external force applied to the switching lever 163-1 is removed, the switching lever 163-1 returns to the original position due to elastic restoring force, and thus the limit switch 163 does not generate the switching signal.

The switch control lever 162 is rotatably hinge-fastened to the upper portion of the bracket 161. The switch control lever 162 may be rotated in a switching direction of the limit switch 163 by the pusher 121-2 provided on the second rotatable disk 121.

In this regard, the switch control lever 162 includes a rotatable lever 162-1, a switch operating end 162-2, and a spring connection end 162-3. The rotatable lever 162-1 is provided on one end portion of the switch control lever 162 about the hinge fastening point of the bracket 161 to be contactable with the pusher 121-2 provided on the second rotatable disk 121. The switch operating end 162-2 is provided on the lower portion of the switch control lever 162 to cause the switching lever 163-1 of the limit switch 163 to perform a switching operation. The spring connection end 162-3 protrudes from the other end portion of the switch control lever 162.

Here, a third return spring 164 is connected to the spring connection end 162-3 of the switch control lever 162 and a predetermined position of the bracket 161 to provide the switch control lever 162 with elastic restoring force toward the original position.

Particularly, the pusher 121-2 presses the rotatable lever 162-1 in a switching direction of the limit switch 163. In addition, the pusher 121-2 extends a predetermined length on the outer surface of the second rotatable disk 121 along a curved line in a circumferential direction such that the rotatable lever 162-1 may maintain a state rotated in the switching direction of the limit switch 163 during folding of the seatback.

Accordingly, when the pusher 121-2 of the second rotatable disk 121 presses the rotatable lever 162-1, the switch control lever 162 including the rotatable lever 162-1 is rotated in one direction, and the switch operating end 162-2 of the switch control lever 162 presses the switching lever 163-1 of the limit switch 163. Consequently, the limit switch 163 may perform the switching operation, and a switching signal may be output to a controller 170.

Figure 9:
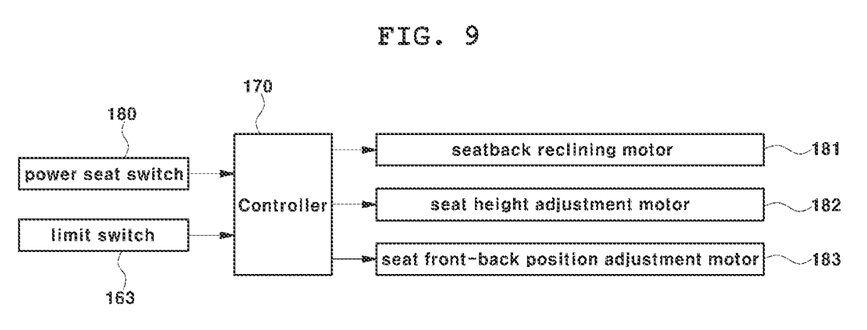
FIG. 9 is a block diagram illustrating a control configuration of the manual seatback folding apparatus according to embodiments of the present disclosure.

In addition, the controller 170 is configured to cut off power to a seat position adjustment motor when the switching signal resulting from the switching operation of the limit switch 163 is received and to control power to the seat position adjustment motor in an allowable state when the switching signal resulting from the switching operation of the limit switch 163 is not received.

Here, as illustrated in FIG. 9, the seat position adjustment motor includes the seatback reclining motor 181, a seat height adjustment motor 182, a seat front-back position adjustment motor 183, and the like driven using a power seat switch 180.

Thus, when the switching signal from the limit switch 163 is received, the controller 170 may perform a control operation to cut off power to the seat position adjustment motors. In this manner, in the case of emergency folding of the seatback, the controller 170 may prevent, for example, the seatback from being unfolded in response to driving of any of the motors caused by accidental manipulation of the power seat switch 180 or an erroneous operation of any of the motors caused by a collision.

In contrast, when the switching signal from the limit switch 163 is not received, the controller 170 performs the control operation in a state in which power is allowable to the seat position adjustment motor. When the user manipulates the power seat switch 180, the respective motors 181, 182, and 183 may be selectively driven for adjustment of the seat.

Flow of operation of the manual seatback folding apparatus according to embodiments of the present disclosure having the above-described configuration will be described as follows.

In the accompanying drawings, FIGS. 3 and 5 are left and right side views, respectively, illustrating the state of the manual seatback folding apparatus according to embodiments of the present disclosure before operation.

As illustrated in FIG. 3, in normal times (before folding of the seatback for emergency escape), the first support protrusion 132-2 of the first pawl 132 among components of the first manual control device 130 is maintained in a state of pushing the first cam 131 while in contact with the first locking support end 131-3 of the first cam 131. Consequently, the first locking pin 131-1 of the first cam 131 is inserted into and fastened to the first locking recesses 111-1 of the first rotatable disk 11.

In addition, the first locking pin 131-1 of the first cam 131 is inserted into and fastened to the first locking recesses 111-1 of the first rotatable disk 111 and remains locked to prevent the first rotatable disk 111 from rotating. Consequently, the seatback frame 100 connected to the first rotatable disk 111 through the shaft 102 is not rotated.

As illustrated in FIG. 5, in normal times (before folding of the seatback for emergency escape), the second support protrusion 142-1 of the second pawl 142 among the components of the first manual control device 130 is maintained in a state of pushing the second cam 141 upwards while in contact with the second locking support end 141-3 of the second cam 141. Consequently, the second locking pin 141-1 of the second cam 141 is inserted into and fastened to the second locking recesses 121-1 of the second rotatable disk 121.

In addition, the second locking pin 141-1 of the second cam 141 is inserted into and fastened to the second locking recesses 121-1 of the second rotatable disk 121 and is maintained in a locked state so that the first rotatable disk 111 is not rotated. Consequently, the seatback frame 100 connected to the second rotatable disk 121 through the shaft 102 is not rotated.

In the accompanying drawings, FIGS. 4 and 6 are left and right side views, respectively, illustrating the state of the manual seatback folding apparatus according to embodiments of the present disclosure after operation.

According to embodiments of the present disclosure, a passenger seated in a rear seat may fold the seatback of a front seat simply by a manual operation of pulling the strap in order to rapidly and easily obtain an emergency escape passage for passengers seated in rear seats in an emergency situation of a vehicle.

For this purpose, a passenger seated in a rear seat pulls the strap 134.

Subsequently, since the strap 134 remains connected to the first pulling bar 133-2 of the lever 133, when the strap 134 is pulled, the lever 133 is rotated in a locking direction, as illustrated in FIG. 4.

In addition, since the engagement pin 132-1 of the first pawl 132 is inserted into and fastened to the engagement hole 133-1 of the lever 133, when the lever 133 is rotated in an unlocking direction, the first pawl 132 is also rotated in the unlocking direction.

Here, the first support protrusion 132-2 of the first pawl 132 is moved to a position below the first unlocking recess 131-2 while being released from contact with the first locking support end 131-3 of the first cam 131.

Consequently, as illustrated in FIG. 4, the first cam 131 is rotated downward due to the weight thereof, and at the same time, the first support protrusion 132-2 of the first pawl 132 is inserted into the first unlocking recess 131-2.

As a result, when the first cam 131 is rotated downward due to the weight thereof, the first locking pin 131-1 of the first cam 131 is separated from the first locking recesses 111-1 of the first rotatable disk 11, as illustrated in FIG. 4, so as to release the locking of the first rotatable disk 11.

Here, in rotation of the lever 133 in the unlocking direction, the second pulling bar 133-3 of the lever 133 is also rotated in the unlocking direction to pull the cable 150. Consequently, an operation of unlocking the second manual control device 140 connected to the cable 150 is performed at the same time.

For this purpose, when the cable 150 is pulled by the second pulling bar 133-3 of the lever 133, since the cable 150 is connected to the cable connection end 142-2 of the second pawl 142 among the components of the second manual control device 140, the second pawl 142 is rotated in the unlocking direction as illustrated in FIG. 6.

Subsequently, as illustrated in FIG. 6, the second support protrusion 142-1 of the second pawl 142 is moved to a position below the second unlocking recess 141-2 while being released from contact with the second locking support end 141-3 of the second cam 141.

Consequently, as illustrated in FIG. 6, the second cam 141 is rotated downward due to the weight thereof and, at the same time, the second support protrusion 142-1 of the second pawl 142 is inserted into the second unlocking recess 141-2.

As a result, when the second cam 141 is rotated downward due to the weight thereof, the second locking pin 141-1 of the second cam 141 is separated from the second locking recesses 121-1 of the second rotatable disk 121, as illustrated in FIG. 6, so as to release the locking of the second rotatable disk 121.

As described above, both the locking of the first rotatable disk 111 and the second rotatable disk 121 are released, both the first rotatable disk 111 and the second rotatable disk 121 are rotatable, and the seatback frame 100 connected to the first rotatable disk 111 and the second rotatable disk 121 through the shaft 102 is also rotatable.

Accordingly, when a passenger seated in a rear seat side pushes the seatback forward, the seatback frame 100 may be rotated and folded forward for emergency escape, thereby easily providing an emergency escape passage for passengers seated in rear seats.

In addition, when the seatback frame 100 is folded, both the first rotatable disk 111 and the second rotatable disk 121 connected through the shaft 102 are also rotated in the same direction. In the rotation of the second rotatable disk 121, the switching operation of the switch device 160 may be performed.

In the accompanying drawings, FIGS. 7 and 8 are right side views illustrating the state of the switch device of the manual seatback folding apparatus according to embodiments of the present disclosure before and after operation.

When the second locking pin 141-1 of the second cam 141 is inserted into and fastened to the second locking recesses 121-1 of the second rotatable disk 121 as described above, the second rotatable disk 121 is locked and is not rotated.

Thus, as illustrated in FIG. 7, the pusher 121-2 of the second rotatable disk 121 is maintained spaced apart from the switch control lever 162, and the limit switch 163 is maintained so as not to perform a switching operation.

Thus, when the switching signal of the limit switch 163 is not received, the controller 170 performs a control operation in a state in which power is allowable to the seat position adjustment motors. Consequently, when the user manipulates the power seat switch 180, the respective motors 181, 182, and 183 may be selectively driven for adjustment of the seat.

That is, when the user manipulates the power seat switch 180, at least one among the seatback reclining motor 181, the seat height adjustment motor 182, and the seat front-back position adjustment motor 183 may be driven. Consequently, the position of the electric seat may be adjusted by the driving of the motor.

In contrast, after the seatback is manually folded to obtain the emergency escape passage, when the position of the electric seat (i.e., a seat, the seatback of which is manually folded) is adjusted variously in response to driving of any of the motors caused by accidental manipulation of the power seat switch or an erroneous operation of any of the motors caused by a collision, emergency escape of the passenger may be interrupted against the intention.

Accordingly, after the seatback is manually folded to obtain the emergency escape passage, power to the seat position adjustment motors may be cut off.

In this regard, when the second rotatable disk 121 connected to the seatback frame 100 through the shaft 102 is rotated along with the folding of the seatback frame 100, the pusher 121-2 provided on the second rotatable disk 121 pushes and presses the rotatable lever 162-1 of the switch control lever 162.

Subsequently, the switch control lever 162 including the rotatable lever 162-1 is rotated in one direction by pushing force of the pusher 121-2, and the switch operating end 162-2 of the switch control lever 162 presses the switching lever 163-1 of the limit switch 163. As a result, the switching operation of the limit switch 163 may be performed and the switching signal may be output to the controller 170.

Accordingly, when the switching signal of the limit switch 163 is received, the controller 170 may perform a control operation to cut off power to the seat position adjustment motors so as to prevent an unintended consequence such as automatic adjustment in the position of the electric seat in the case of emergency folding of the seatback. That is, it is possible to prevent accidental unfolding of the seatback in response to driving of any of the motors caused by accidental manipulation of the power seat switch 180 or an erroneous operation of any of the motors caused by a collision.

More specifically, after the seatback is manually folded to obtain the emergency escape passage, when the position of the electric seat (i.e., a seat, the seatback of which is manually folded) is adjusted variously in response to driving of any of the motors caused by accidental manipulation of the power seat switch or an erroneous operation of any of the motors caused by a collision, emergency escape of the passenger may be interrupted against the intention. To overcome this problem, the controller 170 receiving the switching signal of the limit switch 163 may cut off power to the seat position adjustment motors of the electric seat, thereby more easily obtaining the emergency escape passage by manual folding of the seatback.

As a result, the passenger may fold the seatback of the front seat simply by the manual operation of pulling the strap, whereby the emergency escape passage for passengers seated in rear seats may be rapidly and easily obtained.

Although the exemplary embodiments of the present disclosure have been described for illustrative purposes, those skilled in the art will appreciate that various modifications, additions, and substitutions are possible, without departing from the scope and spirit of the present disclosure as disclosed in the accompanying claims.

What is claimed is:

1. A manual seatback folding apparatus of an electric seat for a vehicle, the apparatus comprising:
    a shaft fastened to a seatback frame to be simultaneously rotatable with the seatback frame, wherein a first end portion and a second end portion of the shaft are rotatably inserted into a first seat cushion side frame and a second seat cushion side frame, respectively;
    a first rotatable disk fastened to the first end portion of the shaft and rotatably arranged on an outer surface of the first seat cushion side frame, the first rotatable disk comprising a first locking recess in an outer circumferential portion thereof;
    a second rotatable disk fastened to the second end portion of the shaft and rotatably arranged on an outer surface of the second seat cushion side frame, the second rotatable disk comprising:
        a second locking recess in an outer circumferential portion thereof; and
        a pusher for operating a switch device protruding from an outer surface of the second rotatable disk;
    a first manual control device mounted on the outer surface of the first seat cushion side frame and detachably engaged with the first locking recess;
    a second manual control device mounted on the outer surface of the second seat cushion side frame to be connected to the first manual control device through a cable so as to work in concert with the first manual control device and detachably engaged with the second locking recess; and
    the switch device mounted on the outer surface of the second seat cushion side frame and configured to perform a switching operation in response to the pusher in a state in which the second rotatable disk is rotated in a folding direction.

2. The apparatus of claim 1, wherein the first manual control device comprises:
    a first cam having a first end portion hinge-fastened to the outer surface of the first seat cushion side frame, wherein the first cam comprises a first locking pin on an upper portion of a second end portion of the first cam and insertable into the first locking recess of the first rotatable disk and a first unlocking recess and a first locking support end provided side by side on a lower portion of the second end portion;
    a first pawl comprising a first support protrusion on an upper portion of a second end portion of the first pawl to be in contact with the first locking support end or to be inserted into the first unlocking recess, the first pawl being hinge-fastened to the outer surface of the first seat cushion side frame; and
    a lever comprising a first pulling bar on an upper portion with a strap connected to the first pulling bar, the lever being coaxially fastened to the first pawl to be simultaneously rotatable with the first pawl.

3. The apparatus of claim 2, wherein:
    the first pawl comprises an engagement pin provided on a first end portion of the first pawl; and
    the lever comprises an engagement hole on a first end portion of the lever, the engagement pin being configured to be inserted into and fastened to the engagement hole.

4. The apparatus of claim 3, further comprising a first return spring connected to the engagement pin of the first pawl and the first seat cushion side frame to provide the first pawl and the lever with an elastic restoring force in a locking direction.

5. The apparatus of claim 2, wherein the lever further comprises a second pulling bar on a second end portion of the lever, the second pulling bar being connected to the second manual control device through the cable.

6. The apparatus of claim 2, wherein the first seat cushion side frame comprises a strap holding portion on the outer surface of the first seat cushion side frame adjacent to a rear portion and configured to guide the strap to a position in which a passenger is able to pull the strap.

7. The apparatus of claim 1, wherein the second manual control device comprises:
a second cam having a first end portion hinge-fastened to the outer surface of the second seat cushion side frame, wherein the second cam comprises a second locking pin on an upper portion of a second end portion of the second cam and insertable into the second locking recess of the second rotatable disk and a second unlocking recess and a second locking support end provided side by side on a lower portion of the second end portion of the second cam; and
a second pawl comprising a cable connection end provided on a first end portion of the second pawl to be connected to the cable and a second support protrusion on an upper portion of the second pawl to be in contact with the second locking support end or to be inserted into the second unlocking recess, wherein the second pawl is hinge-fastened to the outer surface of the second seat cushion side frame.

8. The apparatus of claim 7, further comprising a second return spring connected to the cable connection end of the second pawl and the second seat cushion side frame and configured to provide an elastic restoring force to the second pawl in a locking direction.

9. The apparatus of claim 1, wherein the switch device comprises:
a bracket mounted on the outer surface of the second seat cushion side frame;
a limit switch mounted on a lower portion of the bracket; and
a switch control lever hinge-fastened to an upper portion of the bracket and configured to be rotated in a switching direction of the limit switch by the pusher on the second rotatable disk.

10. The apparatus of claim 9, wherein the switch control lever comprises:
a rotatable lever on a first end portion of the switch control lever about a hinge fastening point of the bracket to be contactable with the pusher on the second rotatable disk;
a switch operating end on a lower portion of the switch control lever and configured to cause the limit switch to perform the switching operation; and
a spring connection end protruding from a second end portion of the switch control lever.

11. The apparatus of claim 10, further comprising a third return spring connected to the spring connection end of the switch control lever and a predetermined position of the bracket and configured to provide the switch control lever with an elastic restoring force.

12. The apparatus of claim 10, wherein the pusher extends a predetermined length on the outer surface of the second rotatable disk along a curved line in a circumferential direction so as to press the rotatable lever and allow the rotatable lever to maintain a state rotated in the switching direction of the limit switch.

13. The apparatus of claim 9, further comprising a controller configured to cut off power to seat position adjustment motors in response to a signal generated by switching the limit switch by the switch control lever being received.

14. The apparatus of claim 13, wherein the controller is configured to allow the power to be supplied to the seat position adjustment motors in a situation in which the signal generated by switching the limit switch by the switch control lever is not received.

15. A vehicle comprising:
a vehicle body;
a first row of seats, a second row of seats, and a third row of seats mounted in an interior of the vehicle in a front-to-rear direction of the vehicle, wherein a seat in the second row of seats is an electric seat; and
a manual seatback folding apparatus coupled to the seat in the second row of seats, the manual seatback folding apparatus comprising:
a shaft fastened to a seatback frame of the seat in the second row of seats to be simultaneously rotatable with the seatback frame, wherein a first end portion and a second end portion of the shaft are rotatably inserted into a first seat cushion side frame and a second seat cushion side frame, respectively;
a first rotatable disk fastened to the first end portion of the shaft and rotatably arranged on an outer surface of the first seat cushion side frame, the first rotatable disk comprising a first locking recess in an outer circumferential portion thereof;
a second rotatable disk fastened to the second end portion of the shaft and rotatably arranged on an outer surface of the second seat cushion side frame, the second rotatable disk comprising:
a second locking recess in an outer circumferential portion thereof; and
a pusher for operating a switch device protruding from an outer surface of the second rotatable disk;
a first manual control device mounted on the outer surface of the first seat cushion side frame and detachably engaged with the first locking recess;
a second manual control device mounted on the outer surface of the second seat cushion side frame to be connected to the first manual control device through a cable so as to work in concert with the first manual control device and detachably engaged with the second locking recess; and
the switch device mounted on the outer surface of the second seat cushion side frame and configured to perform a switching operation in response to the pusher in a state in which the second rotatable disk is rotated in a folding direction.

16. The vehicle of claim 15, wherein the first manual control device comprises:
a first cam having a first end portion hinge-fastened to the outer surface of the first seat cushion side frame, wherein the first cam comprises a first locking pin on an upper portion of a second end portion of the first cam and insertable into the first locking recess of the first rotatable disk and a first unlocking recess and a first locking support end provided side by side on a lower portion of the second end portion;
a first pawl comprising a first support protrusion on an upper portion of a second end portion of the first pawl to be in contact with the first locking support end or to be inserted into the first unlocking recess, the first pawl being hinge-fastened to the outer surface of the first seat cushion side frame; and
a lever comprising a first pulling bar on an upper portion with a strap connected to the first pulling bar, the lever being coaxially fastened to the first pawl to be simultaneously rotatable with the first pawl.

17. The vehicle of claim 16, wherein:
the first pawl comprises an engagement pin provided on a first end portion of the first pawl; and
the lever comprises an engagement hole on a first end portion of the lever, the engagement pin being configured to be inserted into and fastened to the engagement hole.

18. The vehicle of claim 17, further comprising a first return spring connected to the engagement pin of the first pawl and the first seat cushion side frame to provide the first pawl and the lever with an elastic restoring force in a locking direction.

19. The vehicle of claim 16, wherein the lever further comprises a second pulling bar on a second end portion of the lever, the second pulling bar being connected to the second manual control device through the cable.

20. The vehicle of claim 16, wherein the first seat cushion side frame comprises a strap holding portion on the outer surface of the first seat cushion side frame adjacent to a rear portion and configured to guide the strap to a position in which a passenger seated in the third row of seats is able to pull the strap.

* * * * *